(12) United States Patent
Lau et al.

(10) Patent No.: US 7,548,851 B1
(45) Date of Patent: Jun. 16, 2009

(54) DIGITAL MULTIMEDIA JUKEBOX

(76) Inventors: Jack Lau, Flat C2, 33/F, Imperial Court, 62G Conduit Road, Mid-Levels, Hong Kong (CN); Chi Ying Tsui, Room 816, UG Hall 1, Hong Kong University of Science and Technology, Clear Water Bay, Hong Kong (CN); Roger Shu Kwan Cheng, 2/F, Flat H, Tower 2, Nan Fung Plaza, Tseung Kwan O, Hong Kong (CN); Chi Wai Yung, 10F, 2B, Nassau Street, Mei Foo Sun Cheun, Kowloon, Hong Kong (CN); Jimmy Tai Kwan Tang, M1606, Kornhill, Quarry Bay, Hong Kong (CN); Kin Ping Ng, Room 2, 5/F, Hiu Kwong Court, 32 Hiu Kwong Street, Kwun Tong, Kowloon, Hong Kong (CN); Sai Kit Lai, Room 2405, Sau Shan House, Cheung Shan Estate, Tsuen Wan, N.T., Hong Kong (CN); Kai Kin Chan, Room 2012, Hang Yee House, Cheung Hang Estate, Tsing Yi, N.T., Hong Kong (CN); Wing Chau Chan, Room 915, Yung Shue House, Lei Muk Shue Estate, Kwai Chung, N.T., Hong Kong (CN)

( * ) Notice: Subject to any disclaimer, the term of this patent is extended or adjusted under 35 U.S.C. 154(b) by 830 days.

(21) Appl. No.: 09/686,574

(22) Filed: Oct. 11, 2000

Related U.S. Application Data

(60) Provisional application No. 60/158,809, filed on Oct. 12, 1999.

(51) Int. Cl.
*G10L 19/00* (2006.01)

(52) U.S. Cl. ...................................... 704/201; 711/111

(58) Field of Classification Search .................. 711/111; 704/200, 201, 500–504
See application file for complete search history.

(56) References Cited

U.S. PATENT DOCUMENTS 5,142,656 A    8/1992    Fielder et al. .................. 381/37

(Continued)

*Primary Examiner*—Michael N Opsasnick
(74) *Attorney, Agent, or Firm*—Leydig, Voit & Mayer, Ltd.

(57) ABSTRACT

A musical jukebox is disclosed which provides for: fast archiving of songs; a flexible user interface; easy and convenient entry of, access to and/or display of data relating to songs archived by the jukebox; easy and convenient search and locate capabilities for locating, reviewing, retrieving and/or playing songs stored in the jukebox; and low cost relative to the functionality, features, conveniences and user-friendliness provided by the jukebox. Fast of flush archiving of songs (as well as other data and signals) is accomplished by first saving sets of data without compression, which allows the data to be entered quickly, and then, compressing later at an appropriate time. A unique MP3 bit allocation encoding scheme is used to compress data. A unique memory allocation supports fast data archiving. The user interface employs two-way communication between a remote control and the jukebox. A searchable song database is structured to enable very fast searching by music category, and also by title and artist. The jukebox is provided with an on-board song track database to automatically identify new songs input to the jukebox.

16 Claims, 9 Drawing Sheets

U.S. PATENT DOCUMENTS

| | | | |
|---|---|---|---|
| 5,237,460 A * | 8/1993 | Miller et al. | 360/8 |
| 5,343,452 A * | 8/1994 | Maeda et al. | 369/59.26 |
| 5,490,130 A * | 2/1996 | Akagiri | 369/124.08 |
| 5,530,750 A * | 6/1996 | Akagiri | 704/500 |
| 5,581,736 A | 12/1996 | Smith | 395/497.01 |
| 5,621,856 A | 4/1997 | Akagiri | 395/2.38 |
| 5,625,608 A | 4/1997 | Grewe et al. | 369/24 |
| 5,632,003 A | 5/1997 | Davidson et al. | 395/2.38 |
| 5,651,093 A | 7/1997 | Nishiguchi | 395/2.38 |
| 5,694,334 A | 12/1997 | Donahue et al. | 364/514 R |
| 5,742,797 A | 4/1998 | Celi, Jr. et al. | 395/507 |
| 5,761,636 A | 6/1998 | Bolton et al. | 704/229 |
| 5,778,135 A | 7/1998 | Ottesen et al. | 386/52 |
| 5,778,339 A | 7/1998 | Sonohara et al. | 704/224 |
| 5,781,889 A | 7/1998 | Martin et al. | 705/1 |
| 5,784,699 A | 7/1998 | McMahon et al. | 711/171 |
| 5,794,179 A | 8/1998 | Yamabe | 704/205 |
| 5,845,243 A | 12/1998 | Smart et al. | 704/230 |
| 5,852,800 A * | 12/1998 | Modeste et al. | 704/270.1 |
| 5,909,638 A | 6/1999 | Allen | 455/6.1 |
| 5,918,223 A | 6/1999 | Blum et al. | 707/1 |
| 5,926,624 A | 7/1999 | Katz et al. | 395/200.47 |
| 6,192,340 B1 * | 2/2001 | Abecassis | 704/270 |
| 6,205,419 B1 * | 3/2001 | Fiedler | 704/201 |
| 6,370,631 B1 * | 4/2002 | Dye | 711/170 |
| 6,570,837 B1 * | 5/2003 | Kikuchi et al. | 369/275.1 |
| 6,640,145 B2 * | 10/2003 | Hoffberg et al. | 700/83 |
| 6,643,744 B1 * | 11/2003 | Cheng | 711/137 |
| 6,804,638 B2 * | 10/2004 | Fiedler | 704/201 |
| 6,850,252 B1 * | 2/2005 | Hoffberg | 715/716 |

* cited by examiner

*If the remote control does not received display information with in a time-out period, it prompts the user to ask for the display information again*

DIGITAL MULTIMEDIA JUKEBOX

REFERENCE TO RELATED APPLICATIONS

Pursuant to 35 U.S.C. 119(e), this application claims priority benefit of provisional application No. 60/158,809, filed Oct. 12, 1999, the disclosure of which is incorporated herein by reference.

BACKGROUND OF THE INVENTION

The invention(s) disclosed herein relate to compressing, storing, identifying and retrieving digital data such as multimedia data, particularly audio data, and to methods, systems and equipment for doing so. More particularly, the invention(s) relate to a music digital jukebox that performs those functions and methods, and incorporates those systems and equipment. Although the invention(s) have particular application to the audio/video field, the invention(s) can be applied to other equipment in other fields, as will be apparent from this patent document as of the filing dates of this application and the above provisional patent application, and as technology develops. Therefore, while the following description focuses on a music jukebox embodiment, there is no intention to limit the scope of the invention(s) to music jukeboxes.

Large capacity digital jukeboxes using mass storage devices such as a hard disk are currently available. Most of these jukeboxes are PC (Personal Computer)-based, i.e. they use the PC's hard disk to store the music and the PC software and processor for recording, compressing and decoding the music, as well as for organizing a music database and editing the selection list. Typically, speakers or a sound system connected to the PC play the music decoded by the PC.

Stand-alone digital jukeboxes are also available. For example, digital jukeboxes are available from Request Multimedia, Hanko and Creative Labs. The Hanko and Creative Labs jukeboxes do not include a processor which can compress the music (i.e., audio signals representing music) for storage and decode the compressed music for playback. Use of "music" herein sometimes refers to the audio signals representing the music, depending upon the context. Rather, they rely on a PC for these functions. As a result, users are required to compress the music they obtain into MP3 format using a PC, and then download the compressed music to the jukebox. The Audiorequest jukebox, on the other hand, has on-board compression and decoding capability. The audio request jukebox uses a PC architecture to perform the compression and decoding functions, and can be considered a PC.

The jukeboxes described above have hard-disk sizes ranging from 6 Gigabytes to 17 Gigabytes, and currently can store one or two thousand musical selections or "songs", with the number expected to be extended to five or ten thousand songs. Therefore, digital jukeboxes of the type described above can be used not only for playing digital music, but also, and perhaps more importantly, as a convenient device for storing and archiving songs such that users can easily search for, select, retrieve and directly play the retrieved songs. Jukeboxes which include a processor capable of compressing and decoding the music provide additional advantages and convenience.

Nullsoft, Inc. provides an Internet jukebox service (www.winamp.com) and software (WINAMP) which enable a subscriber to store music on Nullsoft's servers, and to access that music over the Internet. Nullsoft provides certain play list functions as well as certain information about a song being played. However, a PC is required to support use of WINAMP.

Currently available music jukeboxes have at least one or more of the following drawbacks, shortcomings and disadvantages: (1) slow archiving of songs (i.e., audio signals representing songs) (use of "songs" herein sometimes refers to the audio signals representing the songs, depending upon the context); (2) a PC or PC processing power is needed to compress the music being archived, which adds expense to an overall system capable of compressing, storing, retrieving and decoding the archived music; (3) poor user interfaces for directing or controlling archiving, identifying, selecting and/or retrieving archived songs; (4) poor systems for searching for wanted songs, whether by title, artist or type of music; and (5) poor systems for providing information relating to stored songs such as song title, artist or group and music type to users. Each of these drawbacks, shortcomings and disadvantages is discussed in more detail below.

Archiving requires transfer of a song from a music CD, for example, and compression of the song. In the case of a CD, a user places the CD in the jukebox and the jukebox will transfer the music audio signals to an internal storage device. (In the case of an LP record or cassette tape, an LP record player or cassette tape player must be connected to the jukebox.) A user with a 200 CD collection must repeat this action 200 times (current jukeboxes have a receptacle for only a single CD). However, because of slow archiving speeds, users must wait considerable time before removing one CD and loading another.

Low cost digital signal processors can achieve one-times to two-times real time compression speed. Current PCs can compress digital music (e.g., MPG3) three to four times faster than real time compression through use of high-end state-of-the-art processors (e.g., Pentium-III® processor), resulting in an archiving time ⅓ to ¼ of the total CD time. However, the cost of these high-end processors can be high. Nevertheless, users are concerned with turn-around time (time required to transfer the songs to the jukebox and the waiting time after the CD is placed in the jukebox) and one-times or even three- to four-times real time processing presents a serious inconvenience.

MP3 coding to compress digital audio is well known in the art. See, for example, U.S. Pat. Nos. 5,142,656, 5,632,003, 5,761,636, 5,778,339 and 5,794,179, and the following documents which contain details of formatting standards: ISO/IEC 11172-3 & ISO 13818-3, MPEG1 & 2 audio layer 3 specifications; X3T10/0948D Information Technology—AT Attachment with Extensions (ATA-2); T13/1153D Information Technology—AT Attachment with Packet Interface Extension (ATA/ATAPI-4); and in standard ISO/IEC 11172-3: 1993(E). The disclosures and contents of all of these patents and documents are incorporated herein by reference.

Unlike traditional audio equipment, such as CD players, FM tuners, MD players, and cassette tape players where there are limits on the number of songs one can select for play (typically less than 20 songs, except for equipment having changer devices such as a CD-changer), the digital jukebox has hundreds to thousands of songs from which the user selects. For a PC-based jukebox, these functions are implemented using a software user interface (e.g., a window) displayed on the PC monitor, which of course requires that a computer be attached to the jukebox. In the AudioRequest jukebox, the user interface is displayed on a TV, which of course requires connection of the jukebox to a TV and operation of the jukebox in front of the TV, which is not always convenient. The Creative Labs jukebox includes a small LCD. A high-end set-top jukebox by Escient has an optional LCD touch screen controller, but is very expensive.

Another drawback of current jukeboxes associated with their capability to store hundreds and even thousands of songs is the time it takes for a user to locate a desired song. For a PC-based jukebox with either a Windows-based or Unix-based operating system, data is organized in a traditional directory (folder) structure. Current computer file structures, such as the structure used by the Microsoft Windows environment, allow the listing of content from one folder only. However, listing all files that have particular parameters (e.g. all files that are in Word format in the C drive) requires the time consuming process of searching every folder and its subfolders for the documents. Searching requires accessing the hard disk many times since the records are stored in different locations on the hard disk and searching requires the hard disk head to move between several different locations during the searching period. This type of directory and file structure is inefficient for storing music data since each song not only has a title, but is also associated with an artist (or group) and a category of music. Thus, the traditional directory structure hinders search speed when looking for songs at least by category.

When a user retrieves a song to be played, the user would like to be provided with information about the retrieved song, such as title, artist or group and category. However, providing that information to jukeboxes is currently inconvenient. CDDB, Inc. currently provides a database of such information. This type of database is referred to herein as the music or track information database. The CDDB music database is accessed over the Internet. (See U.S. Pat. Nos. 5,987,525, 6,061,680) To use this service, a user must have Internet access and must use a PC. The PC sends certain information characteristic of the song to the database over the Internet connection, and the database uses this information to identify the song and return information relating to the song to the PC. This information is referred to herein as "track information." In the case of CDs, such track information includes CD titles, track names, play-times, artist names etc. To obtain track information for a CD, the CD is inserted into the PC CD ROM drive, the PC reads the CD, obtains an ID for the CD and transmits the ID over the Internet to CDDB's database server. (In the case of a standalone jukebox like AudioRequest's, the jukebox connects to the Internet through a PC.) The database then returns the CD track information to the PC (or to the jukebox through the PC).

U.S. Pat. No. 5,751,672 similarly discloses storing a user-searchable database of CD information on a CD changer, and providing for update of the database from a remote database accessed through a modem.

When the jukebox is used as standalone audio equipment at home or in stores, it may be inconvenient for the jukebox to be connected to a PC, or to the Internet. Also whenever the user wants to archive a new CD, the user must connect the jukebox to the Internet again.

There is a need for a music jukebox which does not have one or more of the foregoing drawbacks, shortcomings and disadvantages.

OBJECTS AND SUMMARY OF THE INVENTION

The inventors considered the five major drawbacks, shortcomings and disadvantages of existing jukeboxes and established the following major goals for a music jukebox: fast archiving of selections or songs; flexible user interface; easy and convenient entry of, access to and/or display of data relating to songs archived by the jukebox; easy and convenient search and locate capabilities for locating, reviewing, retrieving and/or playing songs stored in the jukebox; and low cost relative to the functionality, features, conveniences and user-friendliness provided by the jukebox. The inventors innovated to achieve these goals, as well to achieve the following objects of the invention:

provide systems and methods which eliminate or significantly lessen the drawbacks, shortcomings and disadvantages described above for music jukeboxes, as well as for other multimedia applications;

electronically store or archive the data on a large number of CDs into a mass permanent storage device, e.g. a hard disk, DVD-ROM, CD-RW disk, in a more convenient manner and/or in less time and/or at lower cost;

store songs from a number of different sources including LPS, cassettes, etc., into a mass permanent storage device, e.g. a hard disk;

compress songs from sources such as CDs, cassette-tapes, LPs, etc., into either an MP3 or other digital compression format in a more convenient manner and/or in less time and/or at lower cost;

organize song data (e.g., track information) in a database for easy access and retrieval;

store numerous songs while providing easy and convenient identification of songs, as well as easy selections, review and retrieval; and provide a user-friendly interface for identifying, selecting, reviewing and retrieving data such as songs from a mass storage device such as a hard disk;

provide a database of information relating to songs and song collections, and provide easy and user friendly access to the database for searching and editing; associating such a database with mass storage of numerous songs about which the database stores information, such that a user may easily locate and retrieve songs from the mass storage device; and display to a user information obtained from the database when the user searches, selects, retrieves and/or plays a song from the mass storage device.

Fast Archiving of Data ("Flush Mode")

The invention(s) provide for fast archiving of data, e.g., audio signals or songs, without a PC-type processor, and provide a method and system which substantially reduce the turn-around time for archiving audio data while employing relatively inexpensive components. With respect to a music jukebox, the invention(s) practically eliminate the significant drawback of slow archiving of existing jukeboxes without incurring the high cost associated with high-end processors.

Fast archiving of songs is provided in accordance with the invention(s) by transferring the digital or analog music signals to the hard disk without compression. Thereafter, the saved song is compressed, stored on the hard disk, and the disk space previously occupied by the uncompressed song is made available for future storage. Using the invention(s) reduces turn-around time by 7-10 times, and a 60 minute music CD can be stored on the hard disk without compression in 6-8 minutes. Such operation is referred to herein as "flush mode." In order to operate without high-cost, high end processors, the stored uncompressed songs are compressed on-a lower-cost on-board processor while the processor is not performing other tasks, e.g., in a background mode, or when the processor is performing less-extensive processing tasks. Optionally, two low cost processors may be provided, one for storing uncompressed songs and one for compressing the previously stored uncompressed song.

The invention(s) provide a method of fast archiving of a digital jukebox comprising the steps of saving a set of audio signals representing an audio segment (e.g., a song) in an uncompressed format in a memory device of the jukebox; and when the jukebox is not providing a set of audio signals in an uncompressed format for playing, retrieving a set of uncompressed format audio signals, converting the retrieved set to a compressed format (e.g., MP3) and saving the compressed format set in the memory device. As mentioned above, a low cost processor such as a DSP may be used for converting to a compound format, at a low rate, for example, real time or the general range of one-two times real time.

In the preferred embodiment, a unique organization of the hard disk space is provided for archiving and compressing digital data, particularly songs. Separate areas or spaces on the hard disk are provided for storing compressed music, uncompressed data, and compressed versions of stored uncompressed data. A buffer area is also provided for various storage functions, and a free area is provided for additional uncompressed data. The buffer area separates the area on which compressed data is stored from other areas of the hard disk.

Further in accordance with the invention(s), hard disk space is allocated on a dynamic basis. Thus, after an uncompressed set of data (e.g., a song) stored in one area of the hard disk is compressed and stored in another area, the area in which the uncompressed version is stored is returned to the free area.

Also, the area in which a compressed version of a set of data (e.g., a song) is to be stored is pre-reserved, i.e., reserved when an uncompressed set of data is stored. These areas are then added to the area of the hard disk for compressed data when the compressed version is stored. Dynamic allocation and reallocation of the memory space of the hard disk as described herein more efficiently utilizes the memory space available on a hard disk while enabling a fast turn-around of data archiving.

The invention(s) provide a method for storing sets of signals (e.g., sets of audio signals representing audio segments or songs) in a compressed format in at least one memory device from sets of signals in an uncompressed format, comprises the steps of storing one or more uncompressed format sets of signals in a memory device, compressing each uncompressed format set of signals, and storing each compressed format set of signals in the memory device or in another memory device, e.g., disk memory or electronic memory. The compressed format sets of data may be retrieved for use, e.g., converted to an uncompressed format and played (in the case of audio) or displayed in the case of video or images, etc.

The memory space in the memory device in which a set of uncompressed format signals is stored is erased, i.e., made available to store new data, after that set of signals has been compressed. Compression may proceed after all or a part of the uncompressed set of signals has been stored. The respective uncompressed sets of signals may be stored in different parts of the same memory device, e.g., a computer readable disc, preferably a hard disk. Also, sets of signals may be stored in different memory devices. In the case of audio or video data, such data is preferably compressed to MP3 format.

In the preferred embodiment, more than one uncompressed format set of signals may be stored, and these sets are retrieved and preferably converted to the compressed format one set at a time.

A priority may be assigned to the functions of storing uncompressed format sets of signals, converting uncompressed format sets to compressed format sets, and retrieving compressed format sets for use, e.g., play back in the case of the sets of signals representing segments of audio such as songs. For example, storing uncompressed sets, compressing sets and decompressing sets will not be performed at the same time due, for example, to processor or other limitations. Priority may be provided as follows: the decompression function, the storing functions and lastly the compressing function.

The invention(s) also provide a system for carrying the functions described above. Such a system includes one or more memory devices, a processor coupled to the device(s), the processor being programmed to: store in a memory device an uncompressed format a set of signals input to the processor, retrieve an uncompressed format set of signals after at least a part of the set is stored in the memory device, convert the retrieved uncompressed format set of signals to a compressed format set of signals, and store the compressed format set of signals in the memory device or in another memory device.

The invention(s) also provide a method for dynamically allocating memory space on a computer readable and writable disk, which comprises the steps of allocating a first space on the disk for storing sets of signals input to the disk in an uncompressed format, allocating a second space on the disk for storing sets of signals in a compressed format converted from respective uncompressed format sets of signals stored in the first space, and erasing memory space in the first space in which the uncompressed set of signals is stored that was converted to the compressed format and stored in the second space.

The method also includes allocating a third space in the disk for each uncompressed format set of signals stored in the first space, where the third space is allocated for use in converting the respective uncompressed format set to a compressed format set.

The method further provides as buffer space between the first and second spaces, preferably between the first and third spaces.

Still further, the invention(s) provide a computer readable and writable disk structured as follows: a first space on the disk allocated for storing sets of signals input to the disk in an uncompressed format, a second space allocated on the disk for storing sets of signals in a compressed format converted from respective uncompressed format sets of signals stored in the first space, and a third space allocated on the disk for operations in converting an uncompressed format set of signals to a compressed format set of signals.

The computer readable and writable disk having preferably is provided with a buffer positioned between the first and third spaces.

User Interface

In contrast to traditional audio equipment where only 10 to 20 songs can be selected, digital jukeboxes using a hard disk for storage allow users to select songs from thousands of selections. Conventional functions such as play, record, stop, pause, fast-forward, rewind are insufficient to utilize the full jukebox functionality. Full interactivity must provide the user an ability to browse through the selection of songs, select the songs, organize the songs in the digital jukebox, edit the play list, track information, and search for songs to be selected. The inventors concluded that these functions can not be implemented using a conventional one-way remote control. The jukebox status and response to user's actions can not be communicated to the user in an effective way with a one-way remote control. In accordance with the invention(s), a two-way remote control is provided.

Although PC-based digital jukeboxes and some standalone jukeboxes have a measure of two-way communication via the monitor display of the computer or a TV, these two control mechanisms are not very user-friendly because users are required to connect to either a PC or TV in order to use the jukebox. As a result, such current jukeboxes are not really standalone. In cases where neither a PC nor a TV is available, a user cannot communicate with the jukebox. In another case, a display separate from the jukebox or a remote control is inconvenient to use.

Thus, user behavior when operating a jukebox will be very different from user behavior operating other music playback devices. In addition to traditional control functions such as play, pause, stop, fast forward, fast backward, skip etc., a digital jukebox provides more functions such as searching for songs using different parameters, programming and editing a song play list, selecting sound effects, etc. Search parameters can include album or CD name, artist or group name, category of music, etc.

The inventors considered this new user behavior in providing a user-friendly user interface implemented at least partially by a two-way remote control having a display.

The two-way communication remote control with a display device provides for transmitting commands to the jukebox, and the jukebox performing the requested command and returning information associated with the requested command and/or information requested by the command to the remote control. The display associated with the remote control may also display entered commands, at least until the jukebox responds. A time-out feature may be provided, so that if the jukebox does not provide a response to an entered command back to the remote control within a specified time, the remote control prompts the user to take additional action, e.g., enter the command again.

In a music jukebox implementation, where the jukebox stores digital signal representing audio segments and includes a processor for controlling storing and retrieving of stored sets of digital signals, the user interface is implemented by a remote control coupled to the music jukebox for two-way communication between the remote control and the music jukebox. The remote control has a display on which information provided by the music jukebox is displayed and an input device via which information is input to the remote control device and provided to the music jukebox.

With respect to the time-out feature, the remote control processor may be programmed to provide information to the display defining a prompt to a user in response to the elapse of a predetermined time between the processor providing information to the jukebox input on the input device and the absence of information provided by the jukebox to the processor.

In a specific embodiment, a user interface is provided for a music jukebox having a main part and a remote control. The jukebox main part has a processor which controls jukebox functions including generation of audio signals suitable to be played to sound audio represented by the audio signals and information signal. The remote control and the processor in the jukebox main part implement the user interface. The remote control comprises a processor, a display device and an input device. The remote control processor provides information signals to the display device to cause the display device to display information, and receives signals from the input device.

The remote control processor and the jukebox main part processor are coupled for two-way communication such that the remote control processor can provide signals input on the remote control input device to the jukebox main part processor, and the jukebox main part processor can provide information signals to the remote control processor responsive to which the remote control processor provides information signals to the display.

The user interface preferably includes cooperating wireless transmitting and receiving circuitry in the remote control and the music jukebox main part by means of which the remote control processor and the jukebox main part processed are coupled for two-way communication.

MP3 Coding

The invention disclosed herein exploits digital audio signal processing technology to greatly reduce the storage requirement. Using MP3 compression technology, digitized music is compressed by a 1:12 ratio (using the most common format) while still maintaining near CD quality, and one megabyte of memory can store roughly one minute of music. A four minute song thus requires 3-5 Megabytes of memory. A one Gigabyte hard disk can store about 25 audio CD's, or 200-300 songs. A jukebox with an 10 Gigabyte hard disk can store over 250 CDs, or 2000-3000 songs. As hard disk costs decrease, the digital jukebox becomes an ever more attractive solution to audio and data storage.

Advanced MP3 audio compression technology generally uses the psycho-acoustic model and sub-band coding techniques to compress audio data. This technology is known in the art as exemplified by the patents and documents cited above. The audio data is first separated into frames, and each frame is represented by a number of frequency sub-bands, as is conventional and known in the art. For each audio frame, the psycho-acoustic model is first used to determine the masking level for each frequency sub-band by analyzing the audio frame data. The masking level is a maximum signal level unnoticeable to the listener. Consequently, masking levels determine the user tolerable quantization noise levels in frequency sub-bands. Next, a bit allocation algorithm is used to adjust the number of bits (or quantization step sizes) assigned to the frequency sub bands to minimize the worst case quantization-noise-to-mask ratio (or NMR), where the worst case is defined as the maximum NMR among all the NMRs for all frequency sub-bands. This is referred to as the fixed rate case.

When the number of bits used to represent each audio frame is allowed to vary frame by frame according to the audio signal, a threshold is determined for each frequency sub-band of a frame and enough bits are allocated to each sub-band to maintain the required NMR threshold. The remaining unused bits are put in a bit reservoir for future frames. This is referred to as the variable rate case.

However, existing standards for compressing MP3 files are limited to use on a PC. Currently, as proposed in the IOS MPEG I Layer 1, 2, and 3 audio compression standard (ISO/IEC 11172-3: 1993(E)), the bit allocation is accomplished by an iterative algorithm where in each iterative step, either the sub-band with the worst case NMR (in fixed rate case) or the sub-bands whose NMRs do not meet the required thresholds (in the variable rate case) will each be allocated one more bit of quantization resolution. Under this approach, many iterative steps are needed if the optimal bit resolution for different frequency sub-bands vary widely across the sub-bands. Moreover, frequency sub-bands with more bit resolutions than required will not relinquish bits for other sub-bands as long as their bits are not the ones with the worst case NMRs (in the fixed rate case discussed above) or their bits do not meet the NMR threshold requirement from the very first iteration (in the variable rate case discussed above). As a result, the perceptual distortion due to quantization or compression is not uniform across the sub-bands. Under high compression ratios, this non-uniform perception distortion may lead to noticeable degradation in perceptual audio quality.

The invention(s) provide unique processing which can be performed by a lower cost digital signal processor (DSP) to achieve MP3 compression without noticeable degradation in perceptual audio quality.

The inventive bit algorithm adjusts the conventional bit allocation algorithm to minimize the maximum NMR in the fixed rate case and to meet the NMR threshold requirement in the variable rate case. The inventive bit allocation algorithm includes a unique iterative procedure. In the fixed rate case, an iterative algorithm is used to iterate on the NMR level instead of the number of bits. For each selected NMR level, the bit resolution of each frequency sub-band is determined and the total number of bits is obtained. Depending on whether the total number of bits is larger or smaller than the bit budget for a frame, the bit resolution will be adjusted up or down, respectively.

In the variable rate case, frequency sub-bands are inspected to determine the bit resolution for each sub-band needed to achieve the required NMR threshold for that sub-band. Then, the total number of bits for the frame is computed. If it is within the bit budget and the bit reservoir is not overflowing, that bit allocation and all the required thresholds are designated as sufficient. For most frames, the bit allocation will fall within the bit budget.

If the total number of bits computed exceeds the bit budget, an iterative algorithm will be used to determine the quantization step sizes of each sub-band. In each step within the iterative algorithm, the number of bits required to enable each frequency sub-band to achieve an NMR threshold will be computed. After determining whether the total number of bits computed is larger or smaller than the bit budget, the quantization step sizes for all sub-bands will be revised up or down together. Under this approach, the number of iterations is minimal, especially in the variable rate case where often times, no iteration is needed.

The bit allocation technique provided by the invention(s) is applicable to all sub-band compression techniques with or without the psycho-acoustic model. Immediate applications include real-time MP1, MP2, and MP3 encoding (or compression). Compared to present technologies, this technique enables significant computation complexity reduction and better perceptual quality in the compressed audio.

In the inventive bit allocation method of compressing digital signals, in which the digital signals are separated into frames and the digital signals in each frame are converted into a plurality of frequency sub-bands, the method performs the following steps for each frame: determining the maximum allowable step size needed in each sub-band to meet a threshold requirement, and hence the number of bits needed for each sub-band; computing the total number of bits needed in a frame using the maximum allowable step size determined in the previous step; determining if the total number of bits exceeds a predetermined amount, and if so, increasing the step size for all sub-bands until the total number of bits for a frame does not exceed the predetermined number.

The maximum step size is determined by computing an NMR threshold in each sub-band in a frame, quantizing the signals in each sub-band of the frame, and computing a distortion level for each sub-band of the frame. If for each sub-band of the frame the distortion level is not equal to the NMR threshold, the quantization step size is adjusted until the distortion level is approximately equal to the NMR threshold level.

If the total number of bits needed to represent quantization of all of the sub-bands of the frame exceeds a predetermined number, then the quantization step size is increased for all sub-bands until the total number of bit does not exceed the predetermined number.

Searchable Song File Structure (Database)

Since a digital jukebox stores hundreds and thousands of songs, each with different parameters characterizing the song, the inventors realized the advantages of a quick and efficient search capability. For example, a Mariah Carey song can be categorized in different ways. It can be categorized as a female artist song, a Mariah Carey song, a song on a particular album or CD, an English language song, a pop song, a song with vocals, etc. The invention(s) provide a unique database structure or file system which facilitates organizing and searching for songs.

The invention(s) also provide a unique, searchable file system for storing musical selections ("songs") and information relating to each selection such as title, category, artist and the start location of the song in mass memory. This inventive file system is structured so that each record stores information about all or a large number of songs. Thus, a single record or a limited number of records can be searched to obtain the corresponding information for all songs. In contrast, with a Windows OS file system, a search accesses all files in a particular directory or drive.

For example, each record in the inventive file structure may store information about a particular song category, artist or group. Thus, a record which stores information on pop songs archived by the jukebox will indicate which song is a pop song and which song is not. The file structure also maps this information to the storage location of the song.

Further in accordance with the invention(s), each record may occupy one sector of the hard disk. Thus, each record can be read with a single hard drive access.

In a preferred embodiment, each sector contains 512 bytes (so that the entire sector may be read into RAM with a single hard drive access), the juke box archives up to 4096 songs, and each record contains 4096 songs (which occupy 512 bytes).

Thus, a single record can be read in a single hard drive access to determine what songs satisfy the information set in the record. In a specific example, a record may indicate what songs are pop songs by setting a bit in each location corresponding to an archived song, dependent upon whether that song is pop or not.

Each song also has a record of 512 bytes which contains the song title, artist, song category and starting location of the song on the hard disk.

The location of each song record is mapped to the bit location of each record containing song information such as song category. Accordingly, song records can easily be retrieved to indicate the starting address of the song and information about the song such as title, etc., which may be retrieved and displayed while the song is played.

Records storing title, artist and similar information may sort that information to facilitate searching.

The invention(s) provide a searchable database for storing information relating to audio, video or multimedia segments, comprising a plurality of segment records each storing information relating to a segment, and a plurality of category records each having a bit size at least equal to the number segment records and indicating in each bit location whether the corresponding segment falls within the category, the bit locations in each category record being mapped to the segment records.

The invention(s) also provide a method for storing information relating to audio, video or multimedia segments in a searchable database, comprising the steps of storing in a respective segment record information relating to a plurality of segments, storing in a plurality of category records, each having a bit size at least equal to the number of segment records, information indicating whether a segment falls within the category, and mapping segment information in the category records to the segment records.

The database is stored on a computer hard disk, on which is stored each audio, video or multimedia segment.

Each segment record includes the location at which the segment is stored and a title for the segment. In the case of audio, each audio segment record includes the name of an artist or group rendering the audio represented by the respective audio segment record.

Song Track Database

The invention(s) also provide a song track database of song track and CD information which resides in the jukebox for identifying and correlating new songs archived in the jukebox, and for associating this information with the newly archived song. The invention(s) also provide for easy updating of the song track database. For example, the song track information may include album title, track (song) titles, artist names, length of the track, music category and other useful parameters. This database is used to identify a song being archived in or played by the jukebox. This database, which can include information for a large number of songs and CDs (e.g., 500,000 CDs) is contained in the jukebox. Therefore, any song that is being archived in or played by the jukebox can be identified from the database. When a new song is identified through use of the song track database, a record can be created for that song in the searchable song database.

The database can be updated by accessing a remote music database (e.g., over the Internet), or by inserting an update CD or disk in the jukebox, or by manual entry.

The invention(s) also provide a method for generating a signature for a song, which comprises reading a predetermined portion or portions of a song, encoding those portions and saving the encoded portions in association with track information. Song signatures may also be established by track length and CD length information, as known in the art. A song track database is automatically identified by obtaining the song or CD signature by machine reading the signature from the audio data, and searching the database for a match.

The song track database is also searchable semi-automatically to locate a particular song through the use of keywords such as the album title, artist, etc. Where more than one song satisfies the search criteria, a list is provided to the user from which the user selects the requested song.

Bar code scanning, inputting catalog numbers and use of speech files and speech recognition may also be used to identify CDs.

Jukebox Hardware

The inventive digital jukebox preferably includes the following: an internal hard disk; an internal CD ROM reader; an internal low cost processor (e.g., a DSP); a two-way remote control having a display; an internal modem; Smart Media cards or other portable solid state digital memory device; analog to digital and digital analog convertor; datalink to PC; and appropriate inputs and outputs, e.g., an analog audio input and output (line and speaker), digital audio line input and output (e.g., SPDIF format); and Internet connection. The inventive digital jukebox also preferably includes the following software modules: MP3 encoder and decoder; hard disk controller; file structure manager; and user interface.

The digital music jukebox described herein is a complete, stand-alone system that can be used to encode and store CD quality music. In a preferred embodiment, the jukebox functions as a complete stand-alone system featuring quick retrieval and a user-friendly interface. Users will have the ability to quickly input CDs, perform searches either by category or by multiple categories and create play lists according to the searches of the CD database. The inventive digital jukebox provides for adding songs to the archive, retrieving songs from the archive, playing the audio CD and playing the MP3 CD. To add songs to the jukebox archive, an audio signal can be provided from an internal CD player, an external analog audio input (to accommodate input from a cassette tape, a vinyl record, radio audio, or another source), or an external digital audio input. Adding songs to the jukebox also includes compressing the inputted audio signal for hard disk storage with a low cost on-board processor (e.g., a DSP). A selected song is retrieved from the hard disk library of songs and decompressed by the on-board processor.

An audio CD can be played by using the internal CD-ROM player, and outputting to an appropriate output. An MP3 CD may read using the internal CD-ROM player, decoded by the processor and the MP3 software and the resulting audio signal directed to an appropriate output.

In addition to archiving music, the inventive digital jukebox can use its modem to access music, song information, email, news, and other information through the Internet.

As pointed out above, although the invention(s) disclosed herein are implemented in a digital music jukebox, the invention(s) can be implemented in and have application to other devices and fields. For example, the invention(s) have application to archiving and compressing digital data other than that representing audio in general and music in particular, e.g., digital data representing video, still images, graphics, text. Such other digital data may be stored in CDs, various types of discs, and documents. These and other applications of the invention(s) will be apparent from the disclosure herein generally and the description of a digital music jukebox implementing the invention(s).

BRIEF DESCRIPTION OF THE DRAWINGS

The invention is illustrated in the figures of the accompanying drawings which are meant to be exemplary and not limiting, in which like numerals in the different figures refer to like or corresponding parts or structures, and in which.

DETAILED DESCRIPTION OF THE PREFERRED EMBODIMENTS

As pointed out above, the invention(s) are described in connection with implementation thereof in a digital music jukebox. However, there is no intention to limit the invention(s) to use in digital music jukeboxes.

Figure 1:
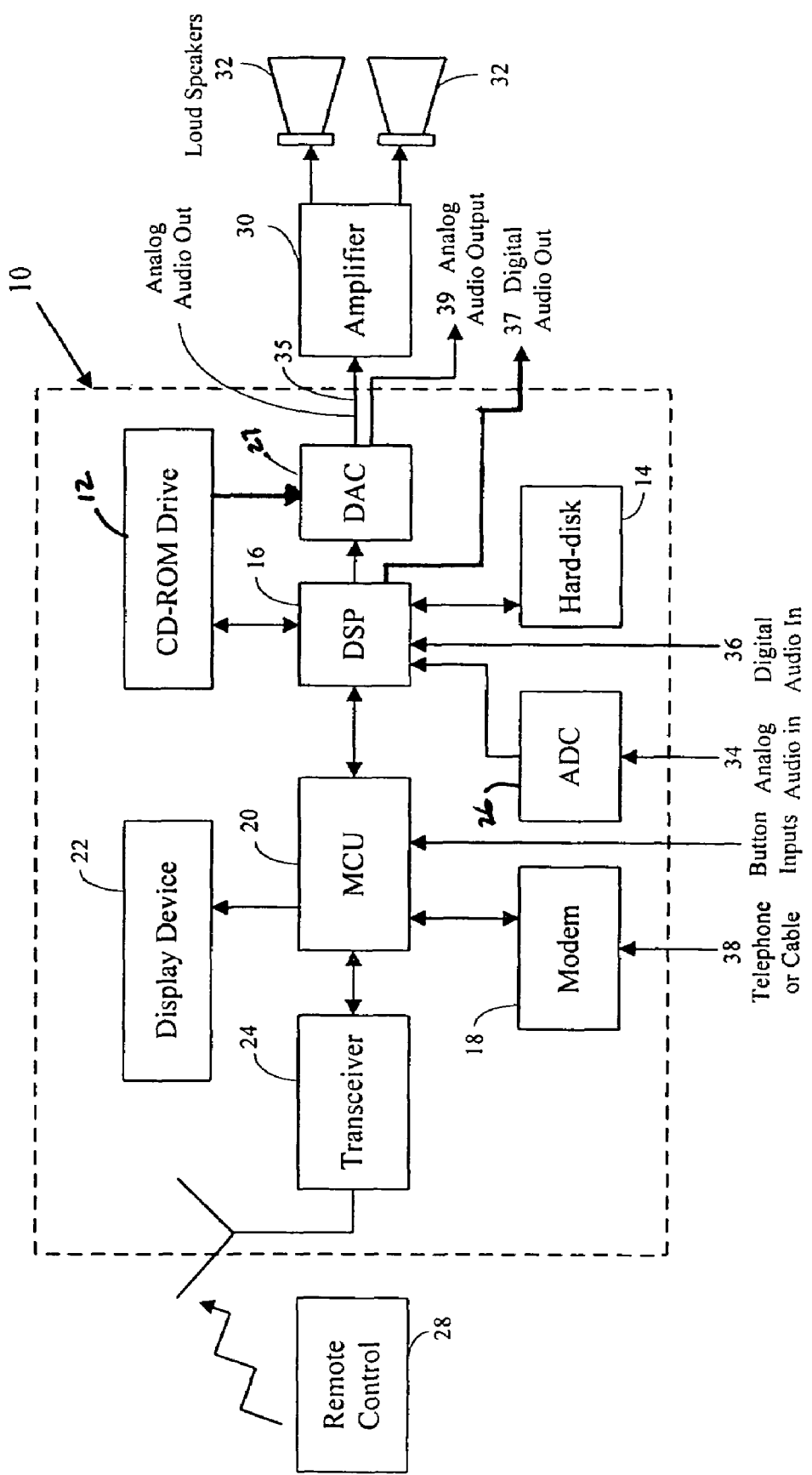
FIG. 1 is a block diagram of a digital music jukebox incorporating the invention.
Figure 12:
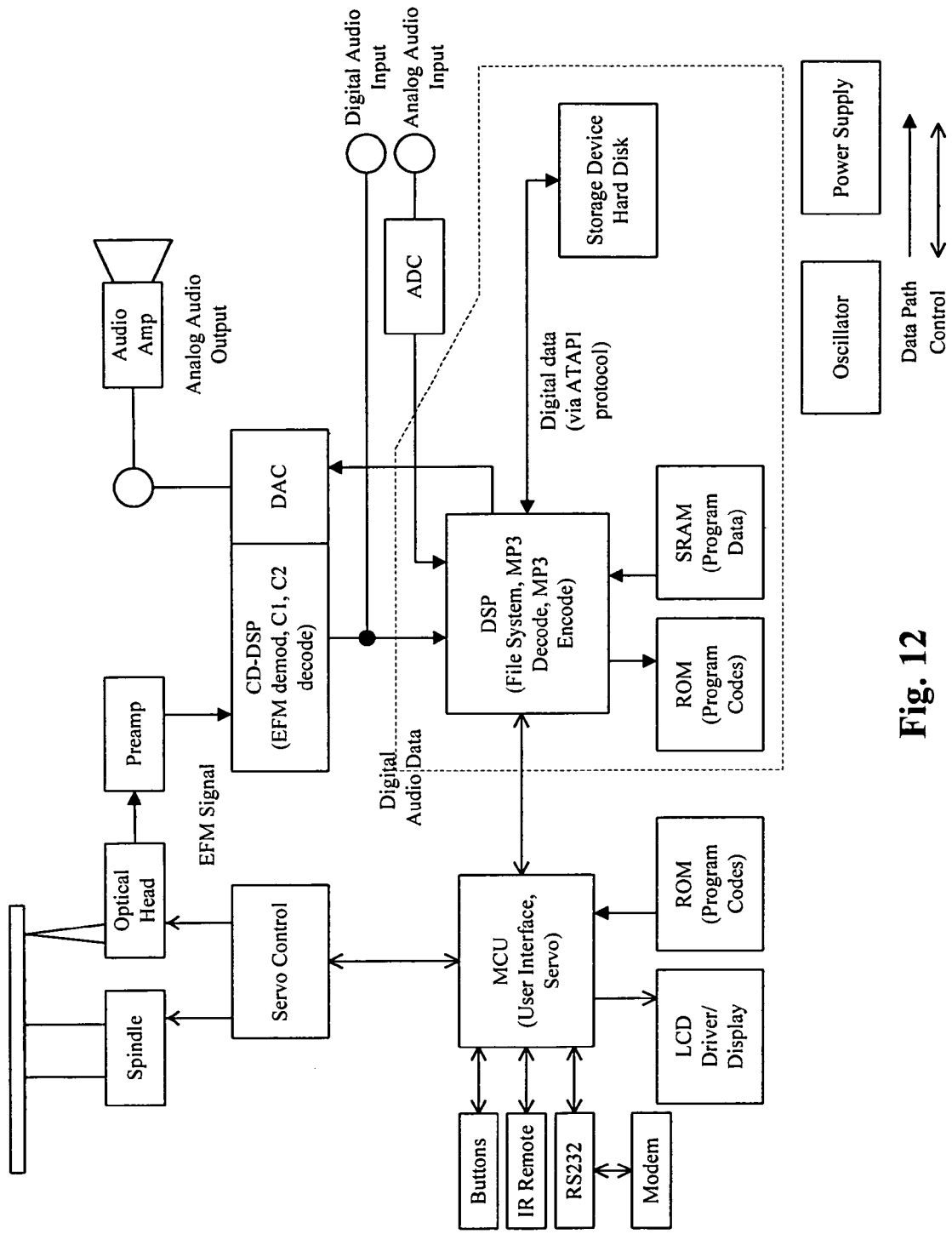
FIG. 12 is a block diagram of another music jukebox embodiment incorporating the invention.

Referring to FIG. 1, in the preferred embodiment, the digital jukebox 10 comprises a CD ROM drive (reader) 12, a hard disk 14, a DSP 16, a modem 18, a micro-controller (MCU) 20, a display device 22, a transceiver 24, an analog to digital convertor 26, a digital to analog convertor 27 and a remote control 28. All of these devices, except for the remote control 28, are provided internally of the digital jukebox 10. Audio components such as an amplifier 30 and speakers 32 may be provided internally, or as shown, externally of the digital jukebox 10. The digital jukebox 10 also includes the following inputs and outputs and appropriate associated hardware: an analog audio input 34 and output 35 (speaker), digital audio line input 36 and output 37 (e.g., SPDIF format); and an input 38 for coupling the modem 18 to a telephone or cable connection. The jukebox 10 may also include an additional analog audio output 39 and one or more Smart Media Cards (not shown). FIG. 12 shows another block diagram of a music jukebox.

The CD-ROM drive 12 functions as an audio signal source for either inputting music into the digital jukebox or for ordinary audio CD playback. The CD-ROM reader 12 can read uncompressed CD audio data, compressed digital audio files (such as MP3 music files), or other computer data files. The hard disk 14 provides mass data storage. The DSP 16 provides digital audio compression and decompression, general audio signal processing and hard disk control. The modem 18 is used for connecting to the Internet for updating the track or song database stored on the hard disk 14, and can also be used for downloading music. The MCU 20 controls jukebox functions. The remote control 28 provides the primary user interface and includes a display device 40 (FIG. 5), an input device 42 and wireless transmit and receive circuitry 24 (e.g., a transceiver) for two-way wireless remote control. The display device 22 on the digital jukebox 10 (FIG. 1) provides a secondary user interface. The amplifier 30 is an analog audio amplifier for driving speakers 32.

In the preferred embodiment, the major software components include: DSP MP3 encoder, DSP MP3 decoder, DSP hard disk interface controller (ATAPI protocol), DSP file structure management system, and MCU/DSP programming for user interface. The digital jukebox 10 processes music files by converting digital audio signals into MP3 (MPEG I Layer 3 Audio Standard) to standard compressed music files. (MP3 is the most popular compression format in the computer and the Internet community.) The DSP 16 encodes digital audio data into MP3 format and decodes MP3 encoded data for playback, and may also add special sound effects to the audio stream.

One example of a suitable DSP that can be used is the Motorola 56300 family DSP. Documents containing details of the formatting standards are referenced above.

High Level Operation of the Jukebox 10

Adding Songs to the Archive: To add songs to the jukebox archive, an audio signal can be provided from any of three possible sources: the internal CD drive 12, an external analog audio input 34 (to accommodate inputs from cassette tape, vinyl record, radio audio, or other source), or an external digital audio input 36. The DSP 16 will compress the audio signal to the hard disk 14 for storage.

Retrieving Songs from the Archive: A song or songs selected from the hard disk library of songs will be decompressed by the DSP 16. The resulting audio signal can be directed to any of three different outputs: an analog audio speaker output 35, an analog audio line output 39, and a digital audio line output 37.

Playing Audio CD: Using the internal CD-ROM drive 12, an audio CD can be played to any of the three outputs 35, 37 and 39, depending on the format output by the CD ROM drive 12.

Playing MP3 CD: Using the internal CD-ROM player 12, an MP3 song stored in a CD-ROM can be retrieved and sent to the DSP 16 for decompression. The resulting audio signal will be played to any of the three outputs 35, 37 and 39, depending on the format output by the DSP 16.

Flush Mode (Fast Archiving Utilizing the Internal Hard Disk)

Flush mode operation in accordance with the invention(s) reduces turn-around time for archiving CDs by 7 to 10 times. In flush mode operation, the audio data is first transferred from a CD to the hard disk using a pure data transfer mode without compression. This transfer is similar to copying the content of a data file from a CD-ROM to the hard disk inside a computer. The turn-around time is therefore limited only by the speed of transfer. The transfer speed depends on the CD-ROM drive speed and the hard disk write-speed, and is typically 7 to 10 times faster than real time. Therefore for a 60-minute CD, a user will only have to wait 6 to 8 minutes before removing the CD from the CD-ROM drive of the jukebox. (However, compression proceeds at approximately one to two times real time using low cost DSPs, so that it will take 30 to 60 minutes to compress a 60 minute CD, depending on the performance of the DSP.)

Once the music data from the CD has been transferred to the hard disk, the actual compression will be carried out. However, audio data compression is carried out during a time or times that the jukebox 10 is not using the available processing capability for some other function, so that compression after saving to the hard disk "in flush mode" is transparent to the user. Of course the number of CD's that can be transferred to the hard drive before compression takes place will be limited by the hard disk space allocated to receive music transferred from CDs. Alternatively, sufficient low cost processing power (e.g., a second DSP) may be provided to compress audio saved to the hard disk at the same time that the jukebox 10 is performing other functions, but this will add to the cost of the jukebox.

In the preferred embodiment, the jukebox 10 compresses digital data stored on the hard disk when the jukebox is not being used or is turned off. When a user does not use the jukebox or the user turns off the jukebox, the jukebox enters a background operation mode. In this mode, the DSP 16 searches through a data list, which lists the songs that have been "flushed" into the hard disk 14 and have not been compressed. The DSP then compresses the songs on the list preferably in the same order in which the songs were flushed to the hard disk. During background mode compression, the original audio data is compressed and the compressed data is stored at a pre-assigned location in the hard disk. Alternatively, depending upon the DSP or other processor used, and what functions are being performed, compression of a song can be started before it was fully flushed to the hard disk 14. After compression, the space that is used to store the original flushed song is made available to receive additional uncompressed digital data.

Digital data may also be flushed to the hard disk 14 from the external analog input 34, digital line input 36, and the modem input 38. Hard disk control is performed by DSP 16. Alternatively, compressed and/or uncompressed data may be stored in electronic memory (not shown) coupled to DSP 16, e.g., flushed to the electronic memory and archived to the hard disk 14.

Figure 2:
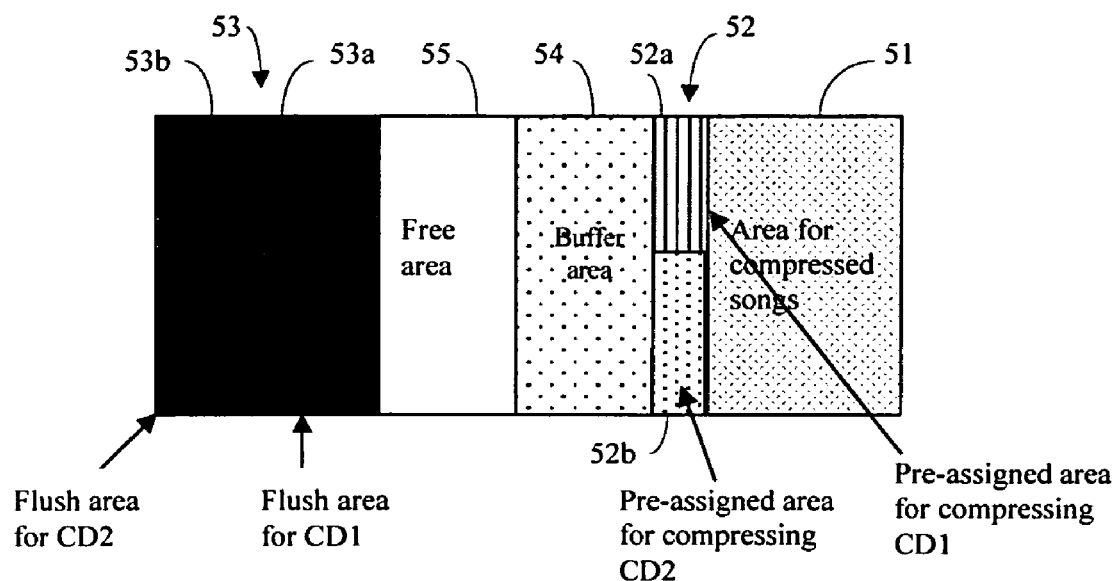
FIG. 2 is a diagram illustrating dynamic partitioning of memory space on the hard disk of the jukebox.

In accordance with the preferred embodiment, flush mode operation involves a unique organization of the hard disk 14 based on dynamic partitioning of the hard-disk memory space. During operation, the memory space on the hard disk 14 is partitioned into five parts, as illustrated in FIG. 2. The first partition 51 is storage for compressed songs. The second partition 52 is a pre-assigned area in which songs that have been flushed onto the hard disk will be stored after compression. The third partition 53 is an area for storing flushed songs that have not been compressed. In FIG. 2, areas 53a and 53b store uncompressed songs from CD1 and CD2, respectively, and areas 52a and 52b are reserved for storing compressed songs from CD1 and CD2, which are currently stored in uncompressed form in memory areas 53a and 53b, respectively. The fourth partition 54 is a buffer area, where songs are stored during real-time compression. The buffer area may be used to listen to a song and compress the song at the same time or when the user wants to compress the audio data input from the digital audio line input 36. The fifth partition 55 is a free area, which can be used for flushing other CDs or storing compressed songs.

Figure 3:
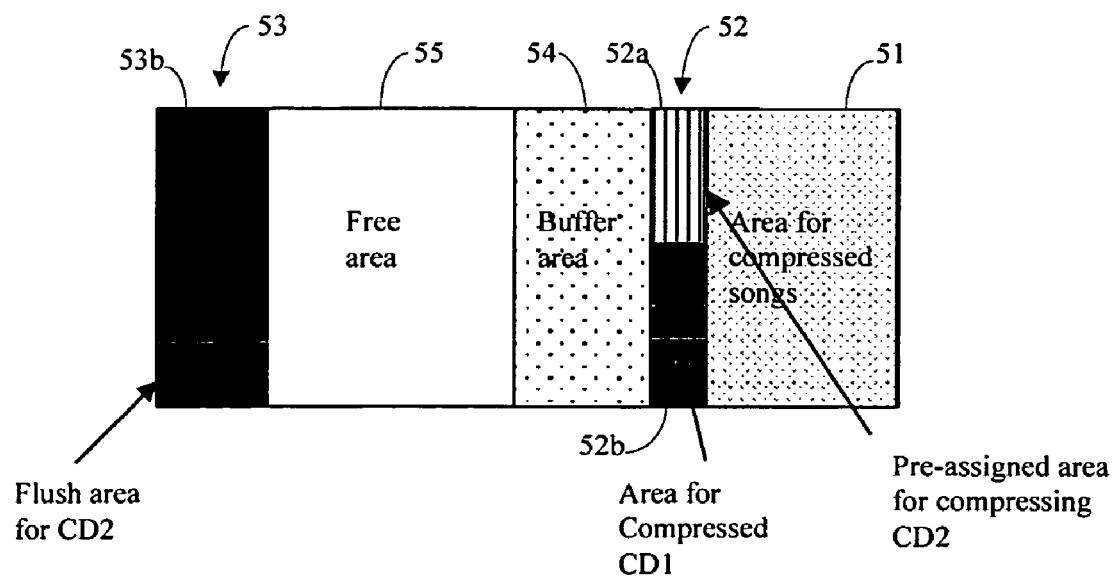
FIG. 3 is a diagram similar to FIG. 2 illustrating memory partitioning after compression of a CD.

The size and the partitioning of the hard disk memory space are dynamically changing. For example, with reference to FIG. 2, after completing the background compression of CD1, the DSP 16 stores the compressed songs in the hard disk space 52a pre-assigned for CD1. The flush area 53a for CD1 will now be reclaimed (erased) and the free area 55 becomes larger. FIG. 3 shows the memory partitioning after CD1 is compressed. If the size of the free area 55 is smaller than the size of an uncompressed CD, the jukebox will prompt the user indicating that the jukebox is unable to flush additional CDs until more free area is reclaimed by background compression or deletion of the other data. By utilizing dynamic partitioning of the hard disk and employing background encoding, the jukebox 10 provides a fast turnaround time for archiving CDs.

Audio Data Compression/Bit Allocation Algorithm

The invention(s) provide the ability to compress audio data into the MP3 format using a highly efficient bit allocation process. Use of this algorithm on a low cost DSP 16 eliminates the need for high end processors or a PC to carry out audio data compression.

At a high level, the inventive algorithm employs two steps for bit allocation. A first step is a loop over all sub-bands to determine the maximum allowable step size needed in each sub-band to meet the threshold requirement, and hence the number of bits for each sub-band. The second step calculates the total number of bits needed in a frame given the maximum allowable step size. If the total number of bits exceeds the bits budgeted for this frame, a larger step size (less bits) will be used for all sub-bands in the frame until the total number of bits for a frame is within the bit budget.

Figure 4A:
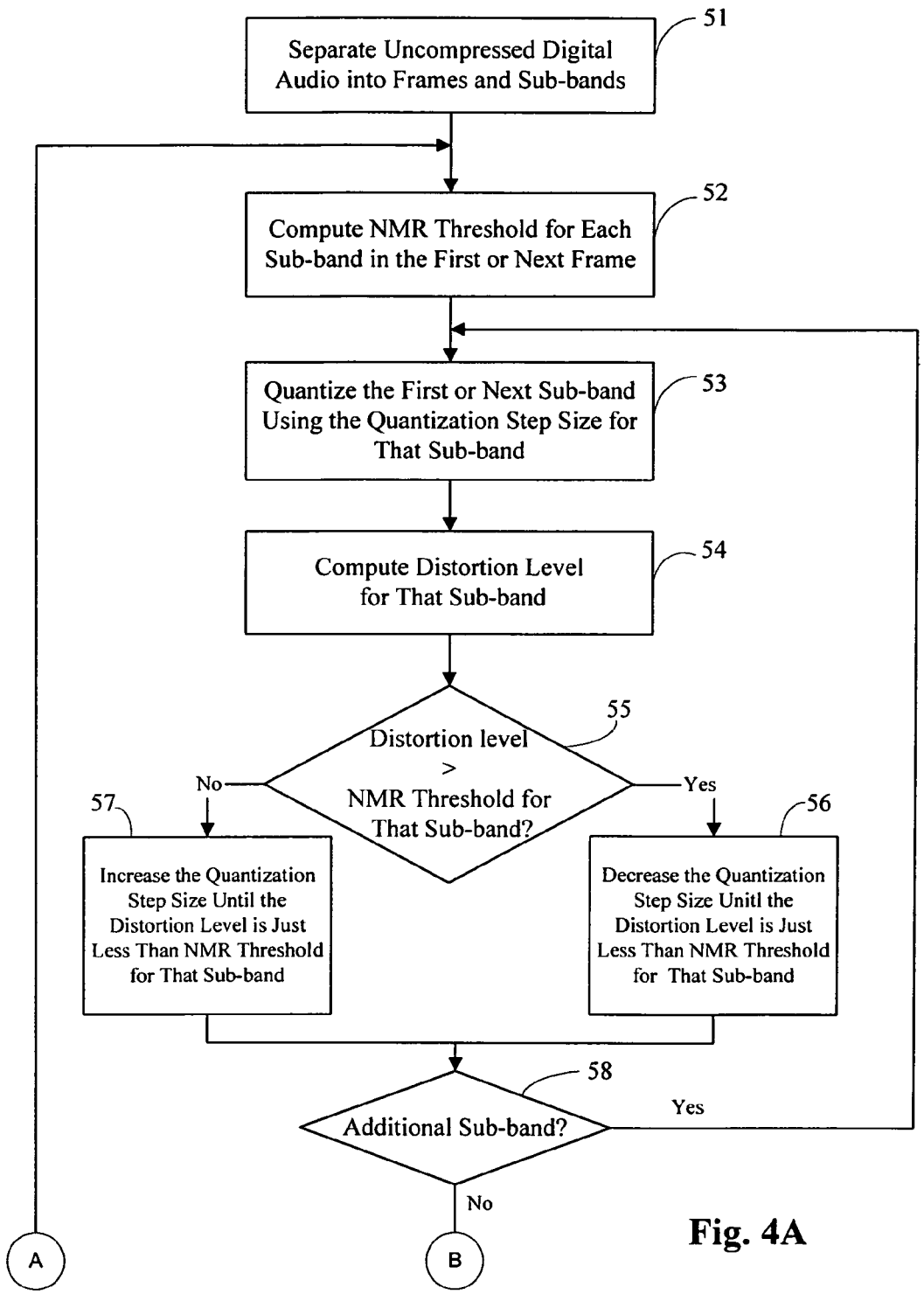
FIGS. 4A and 4B are a flow chart of a bit allocation method used in compressing audio for storage on the jukebox's hard disk.
Figure 4B:
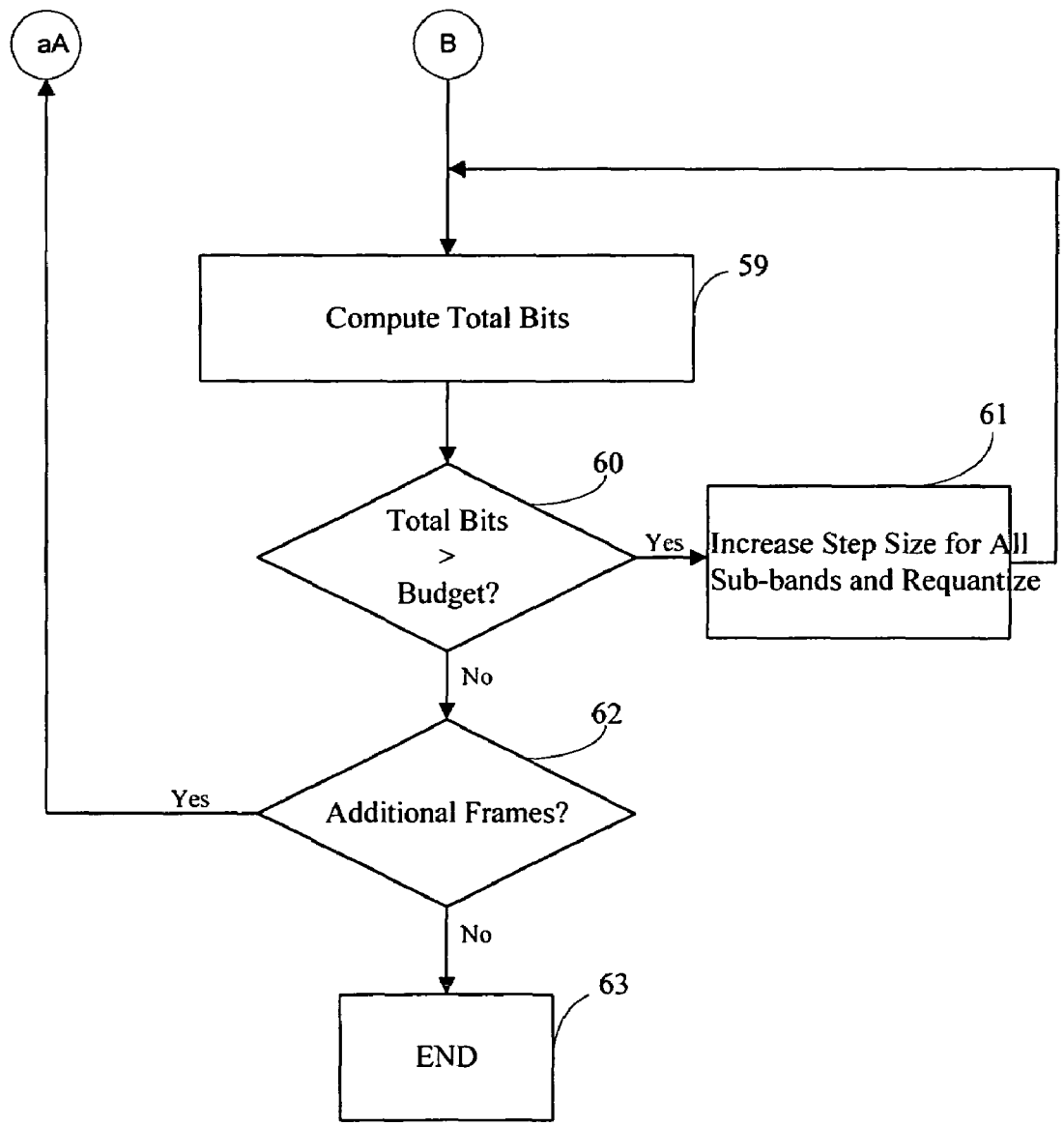

The flow chart in FIGS. 4A and 4B illustrates the algorithm. First, as represented by box 51, the uncompressed digital audio is separated into frames, and the audio in each frame is converted into the frequency domain represented by frequency components in a number of frequency sub-bands determined by a psycho-acoustic model. The frequency sub-bands may be determined for a frame, or all or a group of frames, on a frame-by-frame basis. For convenience, block 51 represents any appropriate process for separating the audio into frames and sub-bands. Processes represented by block 51 are conventional and known in the art. Regardless of the processes employed in step 51, steps 52-62 proceed on a frame-by-frame basis until all frames have been compressed.

In step 52, the NMR threshold is computed for each sub-band in the first or the next frame. In steps 53-58, the data for each sub-band is quantized on a sub-band by sub-band basis until all sub-bands have their distortion levels just lower than their respective NMR thresholds computed in step 52. The distortion level for the sub-band is computed first in step 54. If the distortion level is greater than the NMR threshold for that sub-band, as determined in step 55, then the quantization step size is decreased (step 56) until the distortion level is just under the NMR threshold for that sub-band. Similarly, if the distortion level for the sub-band is lower than the NMR threshold for that sub-band, the quantization step size for that sub-band is increased (step 57) until the distortion level is just under the NRM threshold level. In step 56, the quantization step size is decreased which results in a finer quantization (more bits). In step 57, the quantization step size is increased, which results in a coarser quantization (less bits).

The quantization step size is adjusted in steps 56 and 57 by preset amounts, typically in 1 db steps. When the quantization steps have been adjusted for all sub-bands, the algorithm proceeds to determine whether the total number of bits for a frame is within a preset bit budget. The bit budget is determined by the standard MP3 encoding procedure per the MPEG standard. The total number of bits is computed in step 59 using conventional technology, e.g., the Huffman table and the procedure described in the ISO MPEG 1 Layer 3 standard cited above, and any options therein. Step 60 determines whether the total number of bits determined in step 59 exceeds the bit budget. If it does, then the process loops for another total bit determination iteration after increasing the step size in step 61. Here the step sizes of all sub-bands are adjusted together by the same amount (e.g., 0.75 db) instead of one sub-band at a time as in steps 53-58. The process increases the step sizes for all sub-bands and requantizes the data for all sub-bands in step 61. Then, the process repeats steps 59 and 60 with the requantized data for one sub-band at a time until the total number of bits is within the bit budget (total bits<budget in step 60).

The process loops for each additional frame via step 62 until all frames have been processed. Then, using conventional technology, the data is provided as MP3 formatted audio data in step 63.

The pseudocode for the algorithm is given below

```
Bit Allocation Algorithm
For i=1, num_of_scalefactorsubband
    Quantize data in the $i^{th}$ scalefactor subband using QUANT(i) from the last frame and
        store quantized data in QINPUT
    Compute the distortion level
    If distortion level > Threshold then
        While distortion level > Threshold(i)
            QUANT(i) = QUANT(i)+1
            Re-Quantize data in the $i^{th}$ scalefactor subband using QUANT(i) and store
                quantized data in QINPUT
            Compute the distortion level
        End /*end while*/
    Else
        While distortion level < Threshold(i)
            QUANT(i) = QUANT(i)-1
            Re-Quantize data in the $i^{th}$ scalefactor subband using QUANT(i)
                /* this can be done by right shifting 1 bit every quant is decreased
                by 2 */
            Compute the distortion level
        End /*end while*/
        QUANT(i) = QUANT(i)+1
        Re-Quantize data in the $i^{th}$ subband using QUANT(i) and store in QINPUT
    End /* end if */
End /* end for */
Compute the number of bits, TOT_BIT, needed to represent the quantized input stored in
QINPUT using the Huffman table and related procedure set out in the ISO MPEG 1 Layer 3
encoder standard and any options therein.
m=0
While TOT_BIT > bit_budget
    m = (m mod N) + 1
    For j=0 to int(num_scalefactorsubband/N)-1
        QUANT(jN+m) = QUANT(jN+m) + 1
        Re-Quantize data in the $(jN+m)^{th}$ subband using QUANT(i) and store in QINPUT
    End /* end for */
    Compute the new TOT_BIT
End /* end while */
    The resulting QUANT(i), i=1,...,num_of_scalefactorsubbands give the quantization step
sizes for the scalefactor subbands.
```

In this algorithm, N is a parameter specified for a given design. N must be between 1 and num_of_scalefactorsubands. The larger N is made, the longer the run time, but the better the audio quality. On the other hand, the smaller N is made, the faster the run time, but at the expense of compression audio quality. N is set adaptively in accordance with the value: TOT_BIT-bit_budget.

Primary User Interface

As discussed above, traditional audio equipment provides only a limited selection of songs while digital jukeboxes provide hundreds or even thousands of songs from which to select. To facilitate use with such a large selection of songs, the invention(s) provide functions for the jukebox 10 such as searching for songs using different parameters, programming and editing a song play list, selecting sound effects, etc. Search parameters can include album or CD name, artist or group name, category of music, etc. To accommodate these functions and the new user behavior associated with them and current jukeboxes, a user-friendly user interface is provided for the jukebox 10 implemented at least partially by a two-way remote control having a display.

Figure 5:
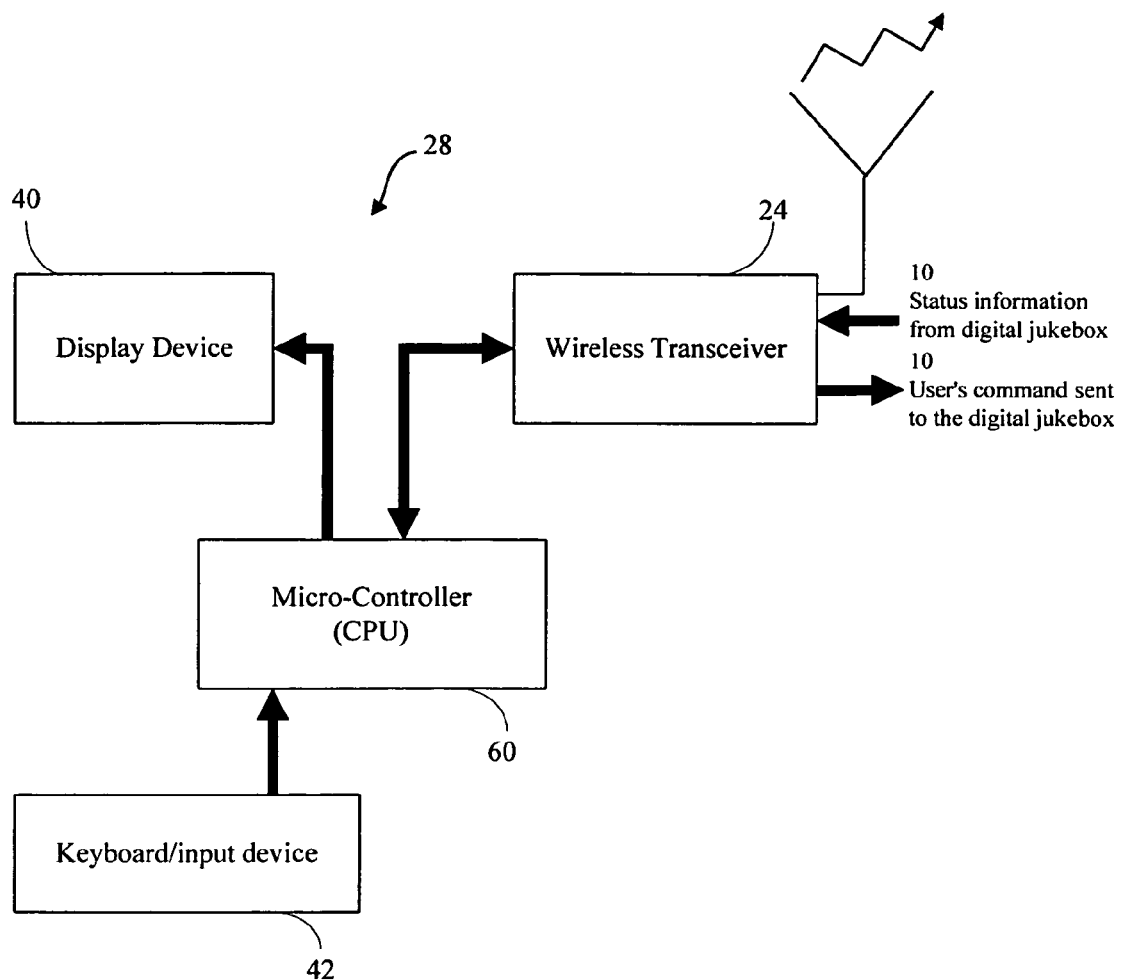
FIG. 5 is a block and flow diagram illustrating operations performed by the remote control of the jukebox.

In the preferred embodiment of the user interface, two-way remote control is implemented wirelessly. Any appropriate wireless technology may be employed, e.g., infrared, radio, sonic. Although a tethered (wired) remote control is within the contemplation of the invention(s), and will provide the user-friendliness and functionality described above, it is not as convenient as a wireless remote control. In the preferred embodiment, two-way wireless communication is achieved with radio technology. Referring to FIGS. 1 and 5, the wireless transmit and receive circuitry in the remote control 28 and the jukebox 10 comprises an rf radio transceiver 24. Any appropriate two-way communication protocol may be used to communicate between the remote control 24 and the jukebox 10, and such protocols are known in the art.

Any appropriate wireless transceiver 24 which incorporates a transmitter and receiver may be used. Alternatively, separate transmitters and receivers may used, which are also known in the art. The transceiver 24 in the remote control 28 transmits commands from the remote control through a wireless channel to the digital jukebox 10, and receives status and response information from the digital jukebox 10. The wireless channel is an rf channel. For example, in the United States, unlicensed bands such as 900 MHz, can be used for the rf channel. In Europe, other bands such as 315 Mhz as well as 900 MHz are available.

The remote control 28 (FIG. 5) also includes a display device 40, an input device 42 and a microcontroller (CPU) 60. In the preferred embodiment, the display device 40 of the remote control 28 is an LCD, but may be LED or any appropriate display device. The display device 40 displays both response and status information transmitted by the jukebox 10. A user interacts with the digital jukebox 10 based on the information displayed on the display device 40.

In the preferred embodiment, the input device 42 is a keyboard, but may be a keypad or touch sensitive device or other input device. Commands are entered into the remote control 28 for transmission to the digital jukebox using the keyboard 42.

The CPU 60 in the remote control (FIG. 5) interprets keyboard inputs and maps the keyboard inputs into a command or set of commands to be transmitted to the digital jukebox 10 for action. The CPU 60 translates the keyboard commands into a digital bit stream and provides the bit stream to the transceiver 24 for transmission to the jukebox 10. The CPU 60 also interprets information provided by the transceiver 24 which was received from the jukebox 10. The CPU converts the received data into a data stream and provides the data stream to the display device 40. The display device 40 displays the information provided by the CPU.

Figure 6:
FIG. 6 are sample screens displayed by the remote control of the jukebox.

The wireless transceiver 24 in the jukebox 10 (FIG. 1) receives command information from the remote control 10 and provides the received information to the MCU 20 in the digital jukebox 10. From this information, the MCU 20 determines what action the jukebox is to perform and controls the DSP 16 accordingly. Such actions may include the following: open/close the CD tray, play/stop/pause/fast-forward/fast-backword/record a song from the CD, play/stop/pause/fast-forward/fast-backword/record a song from the hard disk, volume control, browse the song database in the hard disk/CD, select songs to play, create/edit play list, and special effects. Referring to FIG. 1, the display device 22 in the jukebox 10 displays each action/command being carried out by the jukebox 10. After interpreting received command information, the MCU 20 causes the DSP 16, hard disk 14 or the CD reader 12 to carry out the appropriate operation(s). The MCU 20 also outputs information defining information to be displayed by the display device 40 in the remote control 18, and causes the transceiver 24 to transmit this information to the remote control 28. FIG. 6 shows exemplary screens displayed by the display device 40.

A simple protocol can be used for communication between the remote control 28 and the digital jukebox 10. In the preferred embodiment, communication is always initiated by the remote control 10. The digital jukebox 10 responds to received commands and returns appropriate display information. The remote control 10 acts as a dumb terminal, i.e., it displays information in data received from the jukebox without processing the data. As a result, little processing power is required by the remote control 28, and the remote control can be simple and use a low cost CPU.

Figure 7A:
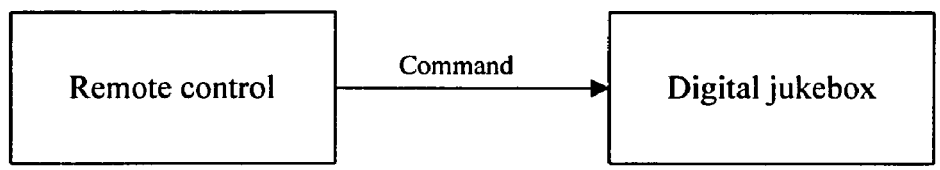
FIGS. 7A-7C are is a flow diagrams illustrating communication between the remote control and the jukebox.
Figure 7B:
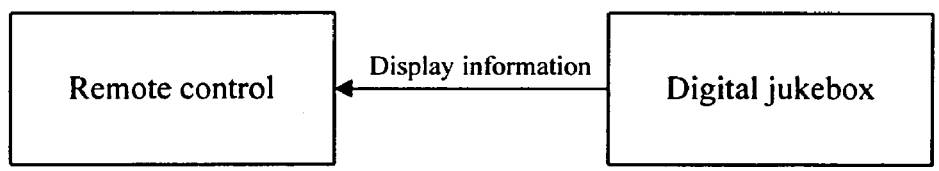
Figure 7C:
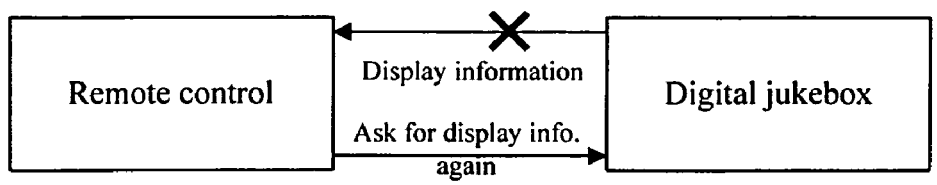

A prompted re-transmission scheme may be employed to ensure that information requested by the remote control 10 is transmitted by the digital jukebox 10 and received by the remote control 28. If the remote control 28 does not receive a response to a command input to the remote control by a user within a defined time period (called the "time-out period"), the remote control 28 will prompt the user to input the last command again (or transmit the last command again if the remote control is provided with a last command memory function). FIGS. 7A-7C illustrate this communication protocol.

Searchable Song File Structure (Database)

As discussed above, an MP3 compressed song of four minutes length requires 3 to 5 Megabytes of hard disk storage. Therefore, a jukebox with a 10 Gigabyte hard disk can store about 2000 to 3000 songs.

The invention(s) provide a unique file system to facilitate organizing and searching such a large selection of songs. There is a vast difference between processor speed (less than 10 ns per instruction for processors with performance higher than 100 MIPS (million instructions per second)) and bulk storage (hard disk) access speed (more than 1000 ns per Byte). Search time is reduced in accordance with the invention by minimizing the number of hard disk accesses required to locate files or records in a particular category or combination of categories. The inventive file structure disclosed herein provides simple and straight-forward category listings comparable to listing files within one folder.

Music files can be stored and organized on bulk storage devices such as hard disks or CD-RWs (recordable CDs). Unlike popular existing file management systems where a file belongs to only one folder, the inventive file organization allows every file to be associated with multiple categories (or virtual folders) simultaneously. Moreover, the inventive file structure allows very rapid searching for all files belonging to a category or any logical combination of categories. Speed of searching is improved because the number of required hard disk accesses is minimized when locating files belonging to any logical combination of categories. Essentially, the file structure facilitates the implementation of full relational database functions such as searching and filtering as specified by user requirements.

Figure 8:
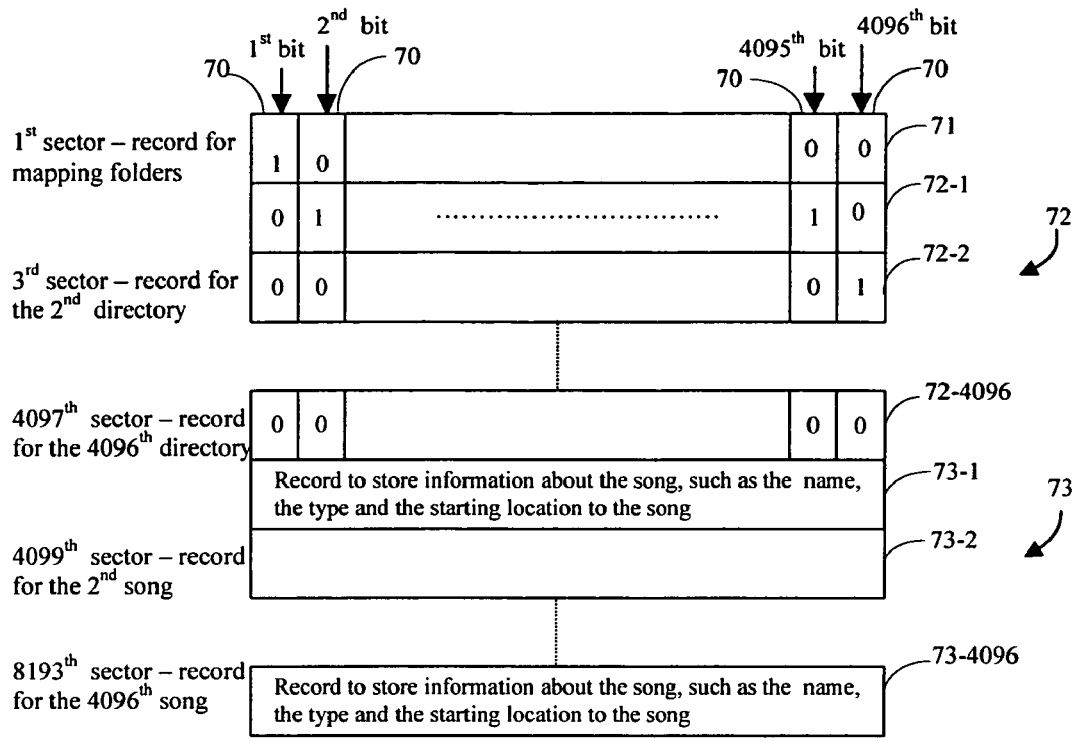
FIG. 8 is a diagram illustrating the searchable song database stored in the jukebox.

The inventive file structure requires less hard disk space for file structure organization, and exploits hard disk organization by using 512 byte sectors. This organization increases speed because it allows each hard disk access to read an entire sector into memory. N sectors are used to represent the records, N being an integer which can be equal to 1, 2, 3, 4 or more, depending on the number of records (e.g. number of songs) to be stored on the hard disk. In the preferred embodiment illustrated by FIGS. 8-9, each 512 byte sector represents one record. A record can be the root of the hard disk, a folder, or a song. FIG. 8 illustrates the inventive file structure for a jukebox that stores a maximum of 4096 songs on the hard disk, and has a maximum of 4096 records or folders organized according to artist name. The inventive file record structure illustrated in FIG. 8 facilitates listing all folders available on the hard disk.

Referring to FIG. 8, when a folder is created on the hard disk, the corresponding bit location 70 at the first sector 71 (i.e. the record for folder mapping) will be set to 1. The number of created folders and their locations can be determined simply by reading a single record, the first record 71, and checking the bit locations 70.

To facilitate song searching, each song can be classified by category. Examples of categories are classical, jazz, pop, rock, folk, English song, male single, female group, Chinese opera, etc. For example, the ID3 international standard of categorizing music uses 128 different categories, and allows another 128 user-defined categories. A user can search by category number, and can group songs on the hard disk according to a searched category or a logical combination of categories to form different play lists. Examples include, all jazz songs, or all Chinese, male, single, and pop songs.

Figure 9:
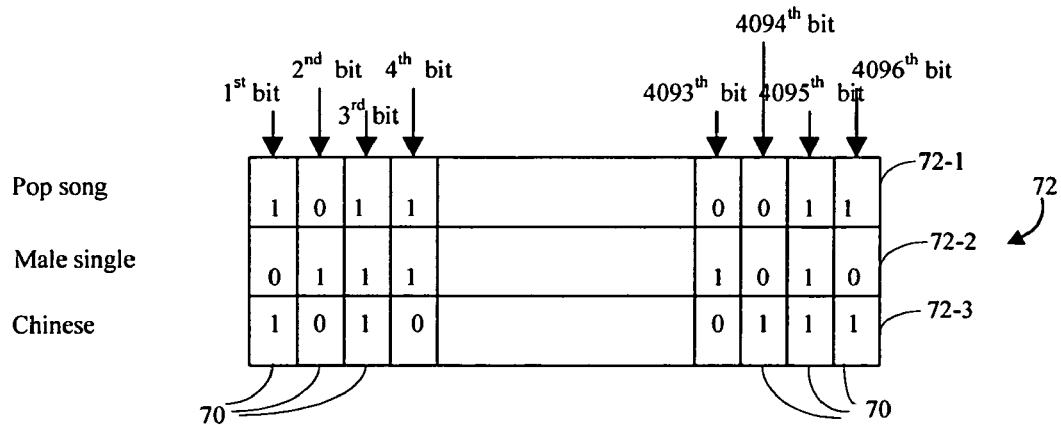
FIG. 9 is a diagram illustrating an example record structure for the song database.

In accordance with the inventive file structure, as illustrated in FIG. 8, a record 72 is created for each music category (72-1, 72-2, . . . , 72-4096), and a record 73 is created for each song (73-1, 73-2, . . . , 73-4096). The records 72, 73 resemble file folders in a Windows file system. Category records 72-1, 72-2 . . . 72-4096 are created for as many as 4096 categories and function as directories for the songs which fall within the respective category. FIG. 9 shows three records for three categories—"Pop song", "Male single" and "Chinese". Each category record (directory) shown in FIG. 9 has 4096 bits (bits #70), one for each of the 4096 songs so that each bit 70 in a category directory 71 represents one song on the hard disk. If a particular song belongs in a particular category (is in the folder), the bit corresponding to the song's location is set to 1 in that record (folder). By checking whether bits are set in a category record, all the songs that are included in that category can be listed. Because each 512 byte hard disk sector corresponds to one category, only one sector has to be read to determine which hard disk locations must be read to retrieve song information in a particular category.

Each song also has its own record 73. Song records 73 have 512 bytes for storing the song name, artist name, other parameters and also the address of the location in the hard disk that points to the beginning of the song. Accessing a song record 73 allows the corresponding song information to be retrieved and provides the DSP with the location of the song in the hard disk so that the DSP can retrieve the song, decode it and play it back.

Referring to FIG. 9, to search for all pop songs, only the sector 72-1 representing the category record for pop songs needs to be read. By reading this sector, a list can be generated according to the songs whose bit locations are set. To search all Chinese, Male single, Pop songs, the corresponding three sectors (72-1. 72-2 and 72-3) shown in FIG. 9 are read and a bit-wise logical AND is performed on the data of the three records/folders. Only songs having their bit locations 70 set in all three sectors will be output. In FIG. 9, the 3rd song and the 4095th song are Chinese, Male single, Pop songs. By using this data and file structure, the search function can be implemented in a very efficient way.

Information relating to title, artist and other parameters is sorted in records 73 to facilitate searching.

Compared to existing technologies, the inventive file structure allows significantly faster searches for songs based on names, types, and any user-definable categories. This is particularly important for using a hard disk to store multimedia files. These disks are likely to have a slow transfer rate (just fast enough for real-time play back), because a faster transfer rate usually requires a higher spin rate which would generate too much audible noise and a humming sound. On this type of disc, searching and listing contents under certain categories requires hard disk access often. With a traditional file structure, this process and consequently the user-interface are very slow. The inventive file structure disclosed herein significantly enhances this speed and therefore the user experience.

The invention(s) also provide the following method for retrieving track information in a semi-automatic way. In this method, the user can use the remote control input device to enter partial CD information, such as keywords in the CD album title or the artist name. This partial information is then sent to the searchable song database, the database is searched using the partial information to obtain CD titles that are a close match with the partial information. Searching by artist or title for both databases are done by a text matching of the artist or title field of the record in the database. In the searchable song database, the field is stored in the song record, i.e. 73-1 to 73-4096. The user then browses through this list and makes the desired selection. Parameters other than keywords of the CD title and the artist's name can be used for this search. For instance, many CD publishers attach a unique bar code number with each published CD. This bar code number can be used as an ID signature for searching. This bar code number can be entered manually using the keyboard 42, or it can be scanned using a bar code scanner and decoding software. The jukebox 10 can be provided with a bar code scanner and decoding software which are known in the art. Alternatively, information provided with the jewel box of most music CDs can be used as ID signatures, such as catalogue numbers used by publishers which are placed on the side of the CD box.

Song Tack Database

An inventive song track database is also provided for the digital jukebox 10. The inventive song database stores track information for the most common CDs available. This track information includes album title, track names, artist names, length of the track, types of music and other useful parameters. These parameters are essential for song searching. The parameters also allow the user to edit play lists or favorite song lists according to this information. The song track database may be provided with the jukebox at the time of purchase populated with track information. Alternatively, the song track database can be constructed after purchase of the jukebox, e.g., from a CD or downloaded from the Internet. The track information of a CD being archived onto the hard disk must be mapped and saved in the song track database stored on the hard disk. The user may also input this information manually. For example, a user can input track information (including artist, title, etc.) using the keyboard 42 on the remote control 28. Alternatively, the track information can be obtained from a remote database. The song track database may also be updated by manual entry or from a remote database.

Figure 10:
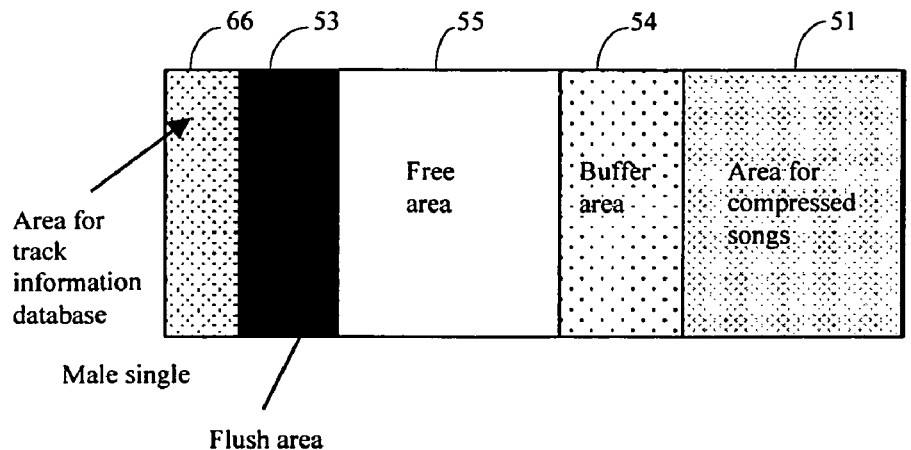
FIG. 10 is a diagram illustrating memory partitioning of the hard disk in the jukebox to incorporate the track information database.

The existence of a hard disk on the jukebox is exploited by the invention(s) by installing the song track database on the hard disk. Typically information relating to a CD can be represented in 500 bytes. Storing a database of information relating to 500,000 CDs will require approximately 250 Mbytes storage space. For a 8.4 Gigabyte hard disk the space allocated for the song track database is only about 2 to 3% of the total space available in the hard disk. The overhead is not significant. FIG. 10 shows the memory organization of the hard disk 14 to incorporate the local track information database in the disk space 66.

According to the invention(s), there are several ways to retrieve and map track information from the song track database with track information from a CD in the CD-ROM drive 12. The first is an automatic way using a remote database as described in U.S. Pat. Nos. 5,987,525 and 6,061,680 cited above. When the CD is placed in the CD-ROM, an ID signature is calculated based on the CD information and the tracks stored on the CD. As disclosed in these patents, the CD table of contents, and the header and track length are used to calculate a CD ID signature.

Figure 11:
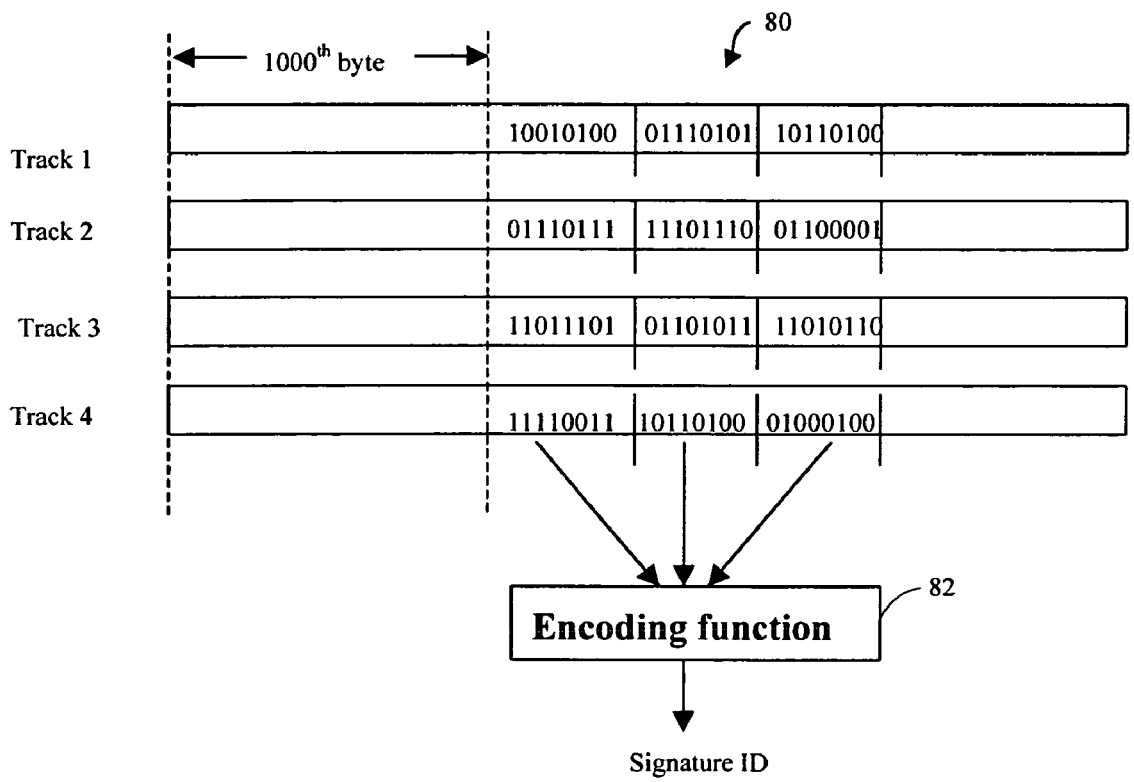
FIG. 11 is a diagram illustrating storing of a digital byte stream in the hard disk of the jukebox.

According to the invention(s), a CD ID may also be obtained by using the audio data stored in the track. The music stored on the CD is in the PCM format. The data is represented as a stream of digital data and organized as stream of bytes. The digital byte streams are different for different songs, as illustrated in FIG. 11. Here, n bytes (n can be any integer number, say 5) are selected from a fixed location of each track (for instance, starting from the 1000th bytes of the track). Selected audio data is encoded and an ID signature is generated from a plurality of encoded segments. A predetermined number of bytes, from a predetermined location or locations on each track are selected and encoded. For example, "x" number of bytes 80 after the 1000th byte are encoded according to any appropriate encoding function 82 to generate a signature for the song on the respect track. Since each track is unique and there is a high probability that the combination of different data for different tracks will also be unique, this signature can thus be used as an identifier for the CD. Different encoding schemes/functions can be used. CRC and RSA are two common types of data encryption that can be used to generate the ID. The song track database can be populated with these signatures mapped to local track information. When a new CD is inserted into the jukebox 10, the portion or portions of the byte stream are retrieved and coded to generate a track ID according to the coding scheme used to generate the IDs in the database. The song track database is then searched to match the ID generated from the byte stream with one stored in the music database to retrieve the mapped track information.

The invention(s) further provide for manual input to map track information for retrieval. Using the keyboard 42 or another input device on the remote control unit 28, a user can input the track information for a particular CD if the user cannot match with the CD with the local track information database.

The invention also provides for the encoding and storing of the CD track information, such as song titles, as compressed voice files. In this embodiment, the jukebox 10 can include a pre-specified internal speech file of a library of CDs. Along with the song titles, a special voice recording of the title and possibly other information, such as trivia, can be pre-stored along with the track information database. The speech files will allow a user to first hear the song title enunciated and then play the song (by decoding first). When the appropriate music is recalled either through the insertion of the original CD or through other means such as through a remote control request, the title will be both displayed in text and spoken in voice. Speech synthesis is well known in the art.

There are several ways to update the song track database, including through a CD-ROM and downloading from a PC. When updating the database through a CD-ROM, the user will use the CD drive 12 internal to the jukebox. The user places the CD containing the newest version of the database in the CD drive 12. The jukebox 10 is programmed to overwrite the old database in response to a command from the remote control 28.

Another way to update the track database is to download the database from a PC or the Internet. The digital jukebox is capable of directly connecting to a PC. The newest version of the track database can be retrieved from the Internet and then downloaded from the PC to the jukebox to replace the old database.

When a new CD is inserted into the CD-ROM drive, or a new song is input to the jukebox 10, a search is made on the song track database to identify the CD and song(s). The search will return all the track information of all the tracks for that CD if there is a match. The track information of each track/song of the CD will be stored in the corresponding song record session (i.e., 73-1 to 73-4096) in the searchable song database.

The foregoing merely illustrates the principles of the invention. It will thus be appreciated that various arrangements may be devised which, although not explicitly described or shown herein, embody the principles of the invention and are thus within its spirit and scope.

The invention claimed is:

1. A method for storing previously recorded sets of audio tracks in a compressed format in at least one memory device and for later retrieving the set of audio tracks in the compressed format, and for converting the set of audio tracks retrieved in the compressed format into a set of signals in an uncompressed format suitable to be played to sound the respective audio-tracks, the method comprising:

transferring a plurality of sets of audio tracks in the uncompressed format from a first storage device to a second storage device, without compression, and storing the set of audio tracks in the uncompressed format in the second storage device;

compressing the set of audio tracks transferred to and stored in the second storage device in the uncompressed format into the compressed format;

storing the set of audio tracks in the compressed format in the second storage device; and upon receiving a request for an audio track to be played, retrieving the set of audio tracks in the compressed format and decompressing the set of audio tracks retrieved into signals in the uncompressed format suitable to be played to sound the audio track, wherein the compressing and the decompressing are performed according to a predetermined priority in which decompressing the set of audio tracks retrieved in the compressed format takes priority over compressing a set of audio tracks transferred in the uncompressed format from the first storage device.

2. The method of claim 1 wherein the compressing comprises compressing the set of audio tracks to MP3 format.

3. The method of claim 1, wherein the predetermined priority gives priority to the transferring over the compressing.

4. The method of claim 1, wherein the predetermined priority includes only compressing the set of audio tracks when there is no pending request for an audio track to be played, and not compressing and decompressing simultaneously.

5. The method of claim 1 comprising retrieving respective sets of audio tracks in the compressed format only after the respective set of audio tracks in the uncompressed format has been completely transferred to the second storage device, wherein the compressing comprises compressing each set of audio tracks in the uncompressed format that has been retrieved.

6. The method of claim 5, wherein the transferring of sets of audio tracks in the uncompressed format comprises storing more than one set of audio tracks in the uncompressed format in the second storage device, and the retrieving of sets of audio tracks in the uncompressed format and the compressing of each set of audio tracks in the uncompressed format that is retrieved comprises retrieving one set of audio tracks at a time in the uncompressed format and compressing one set of audio tracks at a time into the compressed format.

7. A system for receiving sets of signals in an uncompressed format stored on a removable storage device, converting the sets of signals in the uncompressed format to sets of digital signals in a compressed format, and storing the sets of digital signals in the compressed format in at least one memory device, each respective set of signals in the uncompressed format and each set of digital signals in the compressed format representing a respective audio segment, the system comprising:

an input for connecting or reading a removable storage device and through which signals read from the removable storage device are received; and a processor coupled to a memory device and the input, the processor being programmed to:

store in the memory device a set of signals in the uncompressed format supplied to the processor through the input, retrieve from the memory device a set of signals in the uncompressed format from the memory device, convert the set of signals in the uncompressed format that is retrieved into a set of digital signals in the compressed format, store the set of digital signals in the compressed format in the memory device, make available, for future storage, memory space in the memory device in which the set of signals in the uncompressed format was stored, after that set of signals in the uncompressed format has been converted to the set of digital signals in the compressed format, and retrieve a set of digital signals in the compressed format from the memory device and convert the set of digital signals in the compressed format that is retrieved into the uncompressed format suitable to be played to sound a corresponding audio segment, wherein the processor gives priority to converting a set of digital signals in the compressed format and retrieved from the memory device into a set of signals in the uncompressed format over converting a set of signals retrieved from the memory device in the uncompressed format into a set of signals in the compressed format.

8. The system of claim 7 wherein the processor comprises a programmed digital signal processor.

9. The system of claim 7 wherein the processor comprises a programmed digital signal processor and a programmed controller.

10. The system of claim 7, wherein the memory device comprises a computer readable disk, and the processor is programmed to store sets of signals in the uncompressed format and sets of digital signals in the compressed format on the disk.

11. The method of claim 7, wherein the predetermined priority includes only converting a set of digital signals in the uncompressed format to the compressed format when there is no pending request for converting a set of digital signals into the uncompressed format suitable to be played, and not compressing and decompressing simultaneously.

12. A method of archiving sets of audio signals comprising:

providing a memory device;

dynamically partitioning the memory device into a first memory area for storing in the compressed format sets of audio signals, a second memory area for storing in a compressed format sets of audio signals that have been compressed from an uncompressed set of audio signals and that are still stored in an uncompressed format in another memory area of the memory device, a third memory area for storing, temporarily, in the uncompressed format the sets of audio signals stored in the compressed format in the second memory area, and a fourth memory area which is a free area for storing sets of audio signals without regard to format;

under control of a processor, transferring to the memory device, from a removable storage device coupled to an input of the processor, a set of audio signals representing an audio segment, without conversion of the set of audio signals to a compressed format; and only when the processor is not controlling accessing of an audio segment stored in the memory device, retrieving a set of the audio signals transferred to the memory device without conversion to the compressed format, converting the set of audio signals retrieved into the compressed format, and storing the set of audio signals in the compressed format in the second memory area of the memory device.

13. The method of claim 12 comprising erasing from the memory device the set of audio signals transferred to memory device without conversion to the compressed format, after conversion of the set of audio signals to the compressed format, and storing the set of audio signals in the compressed format in the memory device, thereby making available, for future storage, memory space of the third memory area in the memory device in which the set of audio signals in the uncompressed format was stored, after that set of audio signals has been compressed into the compressed format, by transferring that memory space from the third memory area to the fourth memory area.

14. The method of claim 12, wherein the memory device is further divided into a fifth memory area as a buffer area, including temporarily storing a set of audio signals in the uncompressed format in the fifth memory area and retrieving the set of audio signals from the fifth memory area for reproduction and, simultaneously, compressing the set of audio signals into the compressed format.

15. The method of claim 12 wherein converting the set of audio signals retrieved comprises converting at a rate in a range of from one to two times real time.

16. The method of claim 15 wherein the processor comprises a digital signal processor.

* * * * *

UNITED STATES PATENT AND TRADEMARK OFFICE
CERTIFICATE OF CORRECTION

PATENT NO. : 7,548,851 B1  Page 1 of 1
APPLICATION NO. : 09/686574
DATED : June 16, 2009
INVENTOR(S) : Lau et al.

It is certified that error appears in the above-identified patent and that said Letters Patent is hereby corrected as shown below:

On the title page:
Please insert, item

--[73] Assignee: Perception Digital Technology (BVI) Limited, Tortola, British Virgin Islands.

Signed and Sealed this
Nineteenth Day of July, 2011

David J. Kappos
*Director of the United States Patent and Trademark Office*